(12) United States Patent
Pecak et al.

(10) Patent No.: US 11,391,375 B2
(45) Date of Patent: Jul. 19, 2022

(54) ANGLED RADIAL LIP SEAL ASSEMBLY

(71) Applicant: AKTIEBOLAGET SKF, Gothenburg (SE)

(72) Inventors: Robert D. Pecak, Naperville, IL (US); Daniel J. Levy, Arlington Heights, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 38 days.

(21) Appl. No.: 16/878,971

(22) Filed: May 20, 2020

(65) Prior Publication Data

US 2021/0364088 A1    Nov. 25, 2021

(51) Int. Cl.
   *F16J 15/3204*    (2016.01)

(52) U.S. Cl.
   CPC .................... *F16J 15/3204* (2013.01)

(58) Field of Classification Search
   CPC .... F16J 15/00; F16J 15/16; F16J 15/50; F16J 15/52; F16J 15/32; F16J 15/3204; F16J 15/3208; F16J 15/3212; F16J 15/3216; F16J 15/322
   USPC ....................................................... 277/549
   See application file for complete search history.

(56) References Cited

U.S. PATENT DOCUMENTS

| | | | |
|---|---|---|---|
| 3,929,340 A | 12/1975 | Peisker | |
| 4,739,998 A * | 4/1988 | Steusloff | F16J 15/3244 277/309 |
| 8,328,201 B2 * | 12/2012 | Epshetsky | F16J 15/3244 277/551 |
| 8,720,903 B2 | 5/2014 | Epshetsky et al. | |
| 9,228,658 B2 * | 1/2016 | Epshetsky | F16J 15/32 |

* cited by examiner

*Primary Examiner* — Nathan Cumar
(74) *Attorney, Agent, or Firm* — J-Tek Law PLLC; Scott T. Wakeman; Mark A. Ussai

(57) ABSTRACT

A seal assembly for sealing an annular space between a shaft and a housing includes an annular case coupleable with the housing or the shaft and an annular seal member having a sealing surface centered about a centerline. In certain constructions, a coupler is configured to connect the seal member with the case or to connect the case with the housing such that the seal member is positioned with the sealing surface centerline intersecting or skew with respect to a central axis when the seal assembly is installed about the shaft. In other constructions, the seal member has an angled end providing the angled sealing surface. Thereby, the centerline of the sealing surface defines an angle to the central axis having a value of at least one degree, and the sealing surface engages the shaft outer surface to define an elliptical sealing interface extending circumferentially about the central axis.

17 Claims, 12 Drawing Sheets

ANGLED RADIAL LIP SEAL ASSEMBLY

BACKGROUND OF THE INVENTION

The present invention relates to is seal assemblies, and more particularly to radial lip seal assemblies.

Radial lip seal assemblies, also referred to as "oil seals", basically include an annular rigid case and an annular elastomeric seal member connected with the case and providing a circular sealing lip. Such seal assemblies are installed about a shaft and function to seal an annular space between the shaft and an outer housing member, and may seal inwardly against the shaft or outwardly against the housing. Although known radial lip seals provide adequate sealing in most applications, it is desirable to optimize sealing efficiency and increase seal product life.

SUMMARY OF THE INVENTION

In one aspect, the present invention is a seal assembly for sealing an annular space between a shaft and a housing, the shaft or the housing being rotatable about a central axis extending through the shaft, the shaft having an outer circumferential surface and the housing having an inner circumferential surface. The seal assembly comprises an annular case coupleable with the housing or with the shaft and an annular seal member coupled with the case and having a circular sealing surface with a centerline. The sealing surface is engageable with the shaft outer surface or with the housing inner surface such that the centerline of the sealing surface is angled or skew with respect to the central axis when the seal assembly is installed about the shaft.

In another aspect, the present invention is again a seal assembly for sealing an annular space between a shaft and a housing, the shaft being rotatable about a central axis. The seal assembly comprises an outer annular case coupleable with the housing and an inner annular seal member having a centerline and a circular, inner circumferential sealing surface centered about the centerline. A means positions the seal member such that the centerline of the seal member intersects or is skew with respect to the central axis when the seal assembly is installed about the shaft, preferably a coupler or a housing bore. As such, the centerline of the seal member defines an angle with respect to the central axis, the angle having a value of at least one degree, and the sealing surface engages the shaft outer surface so as to define a generally elliptical sealing interface extending circumferentially about the central axis.

In a further aspect, the present invention is once again a seal assembly for sealing an annular space between a shaft and a housing, the shaft or the housing being rotatable about a central axis extending through the shaft. The seal assembly comprises an annular case coupleable with the housing or with the shaft and an annular seal member having a centerline and a circular circumferential sealing surface centered about the centerline. A coupler is configured to connect the seal member with the case or with the shaft or to connect the case with the housing such that the seal member is positioned with the centerline of the seal member intersecting or skew with respect to the central axis when the seal assembly is installed about the shaft. As such, the centerline of the seal member defines an angle with respect to the central axis, the angle having a value of at least one degree, and the sealing surface engages the shaft outer surface so as to define a generally elliptical sealing interface extending circumferentially about the central axis.

In an even further aspect, the present invention is yet again a seal assembly for sealing an annular space between a shaft and a housing, the shaft or the housing being rotatable about a central axis extending through the shaft. The seal assembly comprises an annular case coupleable with the housing or with the shaft and an annular seal member with a centerline and having an inner axial end connected with the case, an outer axial end providing a circular sealing surface and a central portion extending between the inner axial end and the outer axial end. The seal member central portion has an axial length varying from a greatest value at a first angular position about the centerline to a least value at a second angular position about the centerline spaced one hundred eighty degrees from the first angular position. As such, the sealing surface is disposed within an angled plane, the body centerline and the central axis extending non-perpendicularly to the angled plane when the seal assembly is disposed about the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
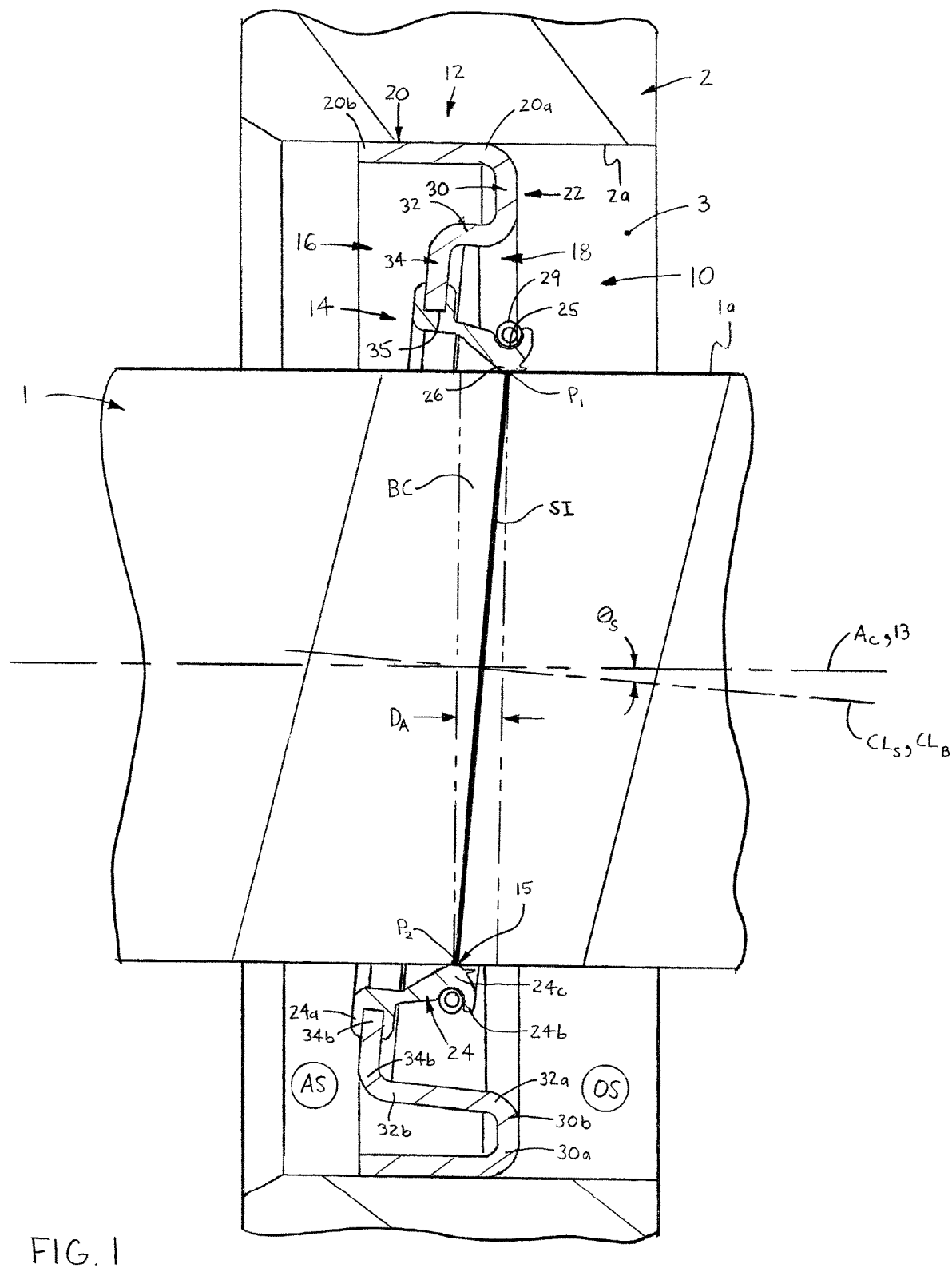
FIG. 1 is an axial cross-sectional view of a first, inwardly-sealing construction of a seal assembly in accordance with the present invention, shown installed about a shaft and within a housing.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-12 a seal assembly 10 for sealing an annular space between a shaft 1 and a housing 2. The shaft 1 has an outer circumferential surface 1a and the housing 2 has an inner circumferential surface 2a defining a bore 3. Either the shaft 1 is rotatable within the housing 2 about a central axis $A_C$ extending through the rotatable shaft 1 or the housing 2 is rotatable about the central axis $A_C$ extending through a fixed shaft 1. Basically, the seal assembly 10 comprises an annular case 12 with a centerline 13 and an annular seal member 14 coupled with the case 12 and having a circular sealing surface 15 with a centerline $CL_S$. The sealing surface 15 is engageable with the shaft outer surface 1a or with the housing inner surface 2a such that the centerline $CL_S$ of the sealing surface 15 is angled or skew with respect to the central axis $A_C$ when the seal assembly 10 is installed about the shaft 1; i.e., the centerline $CL_S$ is not coaxial with or parallel to the axis $A_C$. The seal member 14 is preferably "fixed" on or to a non-rotatable housing 2 or shaft 1 and seals against a rotating member 1 or 2, but may also be fixed on/to a rotatable shaft 1 or housing 2 and seal against a fixed house 2 or shaft 1, respectively.

Figure 10:
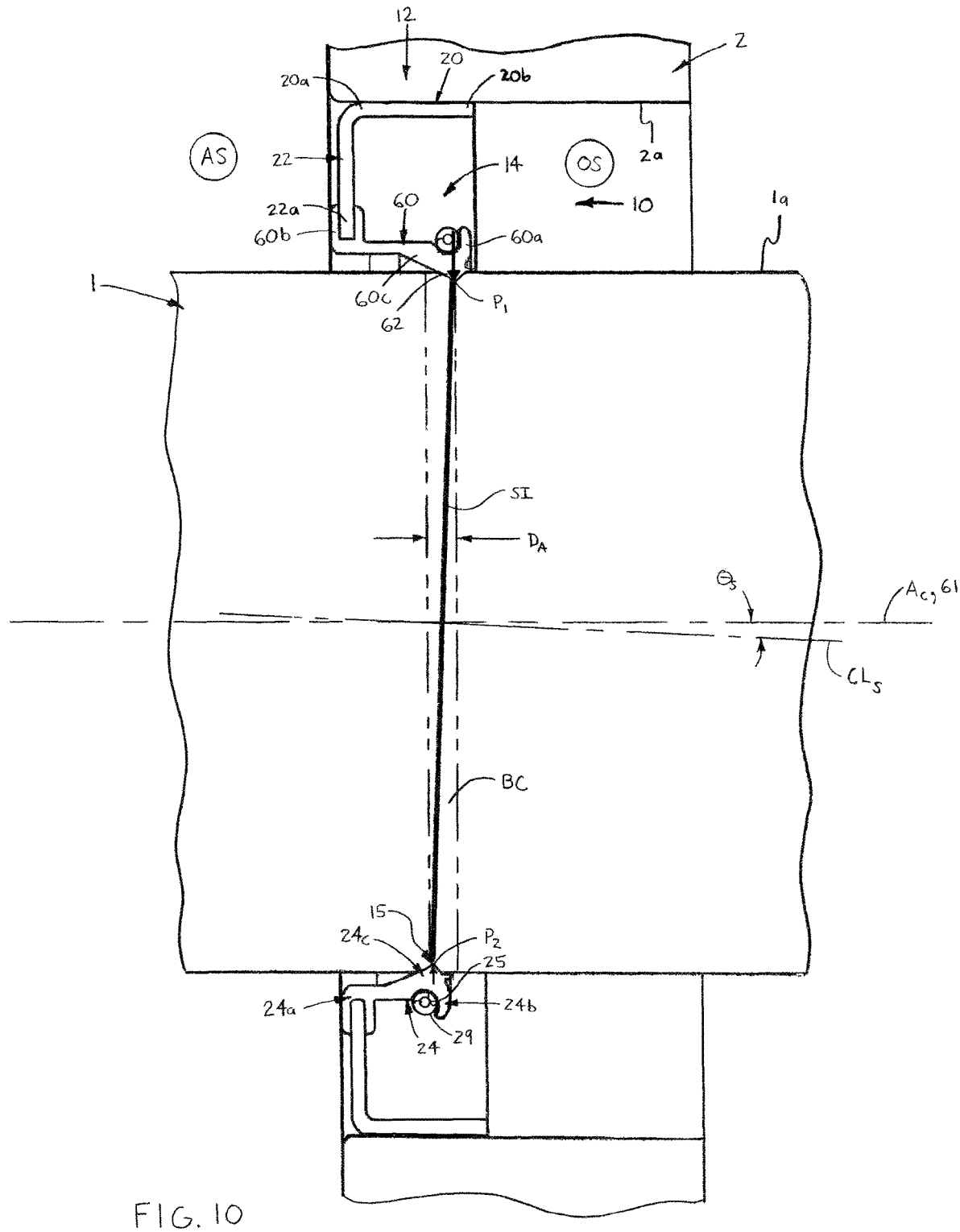
FIG. 10 is an axial cross-sectional view of a fourth, inwardly-sealing construction of the seal assembly, shown installed about a shaft and within a housing.
Figure 11:
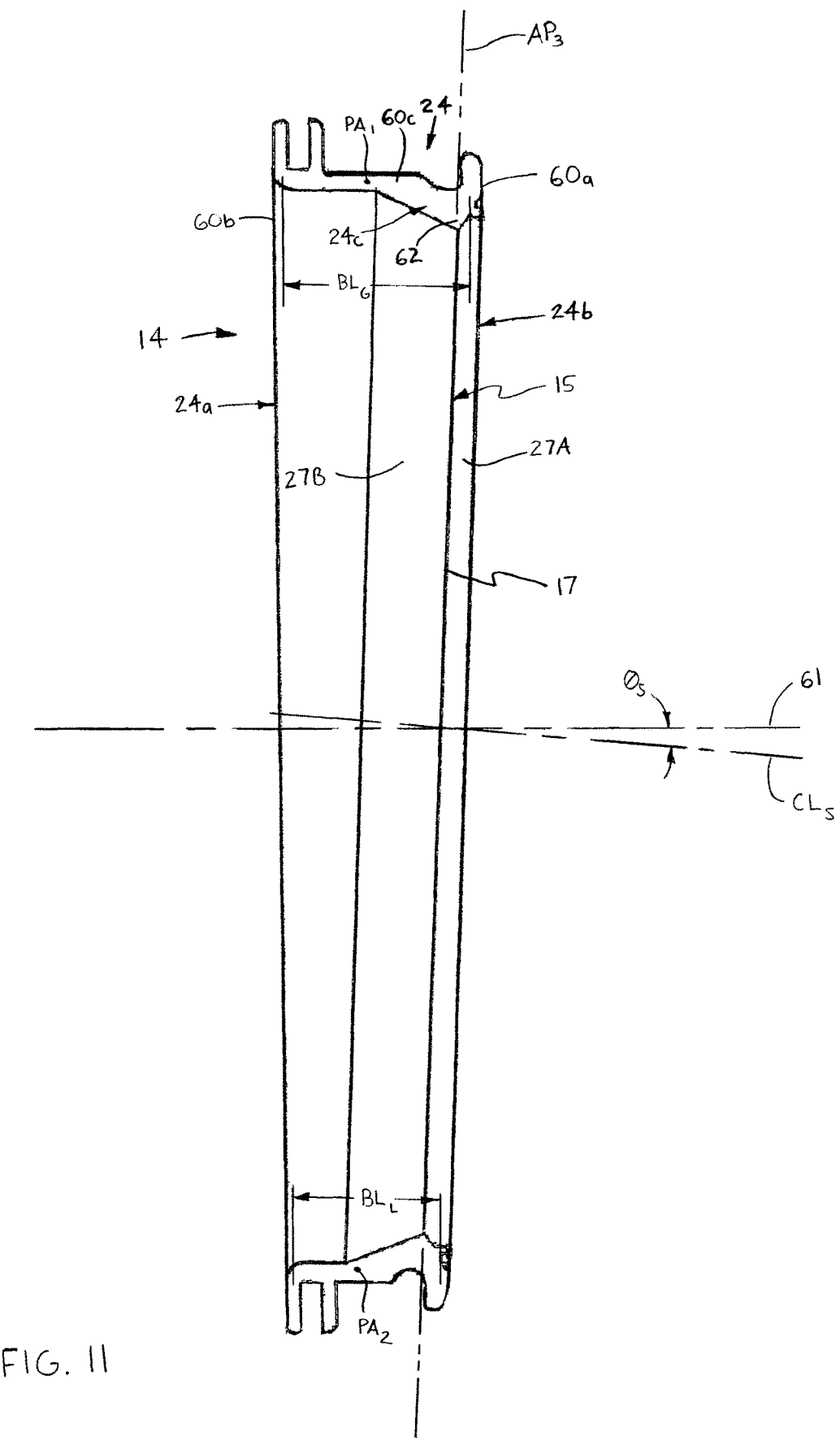
FIG. 11 is an axial cross-sectional view of the seal member of the fourth construction seal assembly.

In certain constructions depicted in FIGS. 1-9 and 12, the seal assembly 10 includes a means or device 16 for positioning a generally conventional annular seal member 14 such that the centerline $CL_S$ intersects or is skew with respect to the central axis $A_C$, preferably a coupler 18 as described below. In other constructions as shown in FIGS. 10 and 11, the seal assembly 10 is formed with a generally standard case 12 and the seal member 14 includes an annular body 60 having an angled outer end 60a providing the circular sealing surface 15, which is oriented with the surface centerline $CL_S$ angled/skew with respect to the central axis $A_C$. In any case, the centerline $CL_S$ of the sealing surface 15 defines an angle $\theta_S$ with respect to the central axis $A_C$, the angle $\theta_S$ having a value of at least one degree (1°) and preferably between two and a half degrees (2.5°) and five degrees (5°) or even greater (e.g., >5°), for reasons described below.

Figure 5:
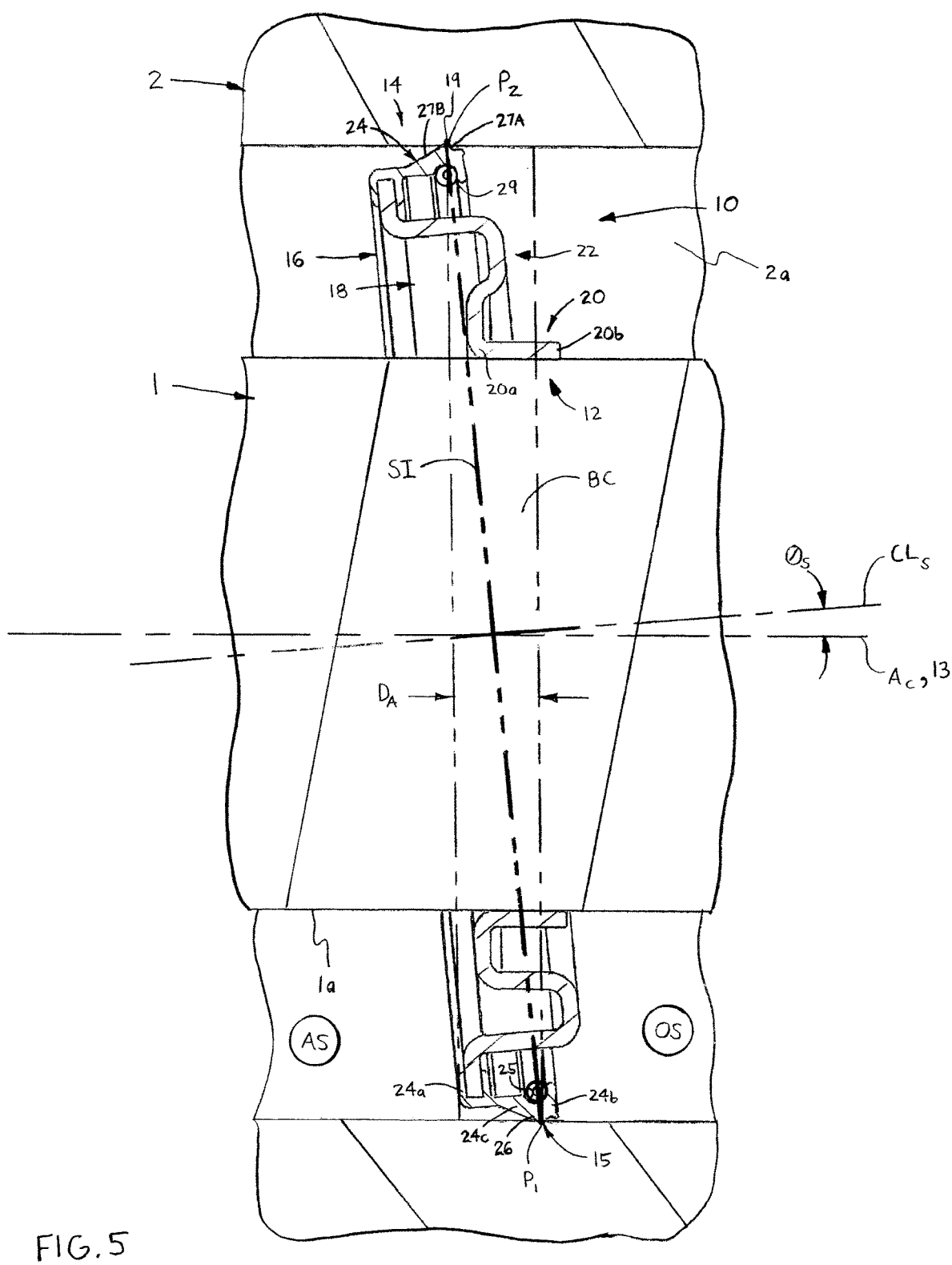
FIG. 5 is an axial cross-sectional view of a second, outwardly-sealing construction of the seal assembly, shown installed about a shaft and within a housing.
Figure 6:
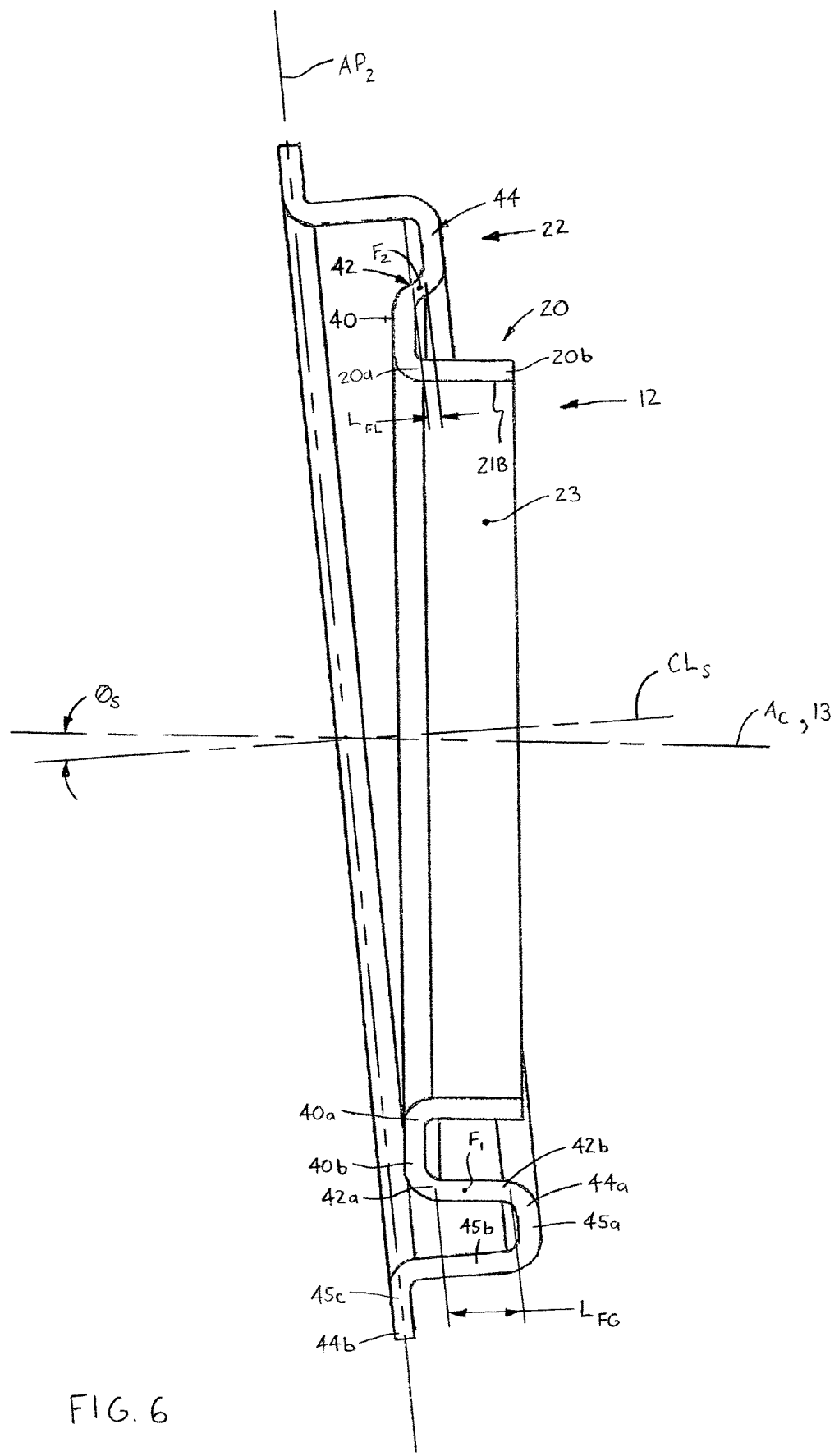
FIG. 6 is an axial cross-sectional view of a combined case and coupler of the second construction seal assembly.

Further, the case 12 is formed of a rigid material, preferably a metallic material (e.g., aluminum, low carbon steel, etc.) but may be formed of a rigid polymer, a ceramic, etc., and is coupleable with the housing 2, either directly or through the coupler 18 or another intermediate component (none shown), or is mounted on the shaft 1. The case 12 has a centerline 13 and includes an axial portion 20 with opposing axial ends 20a, 20b and a radial flange 22 extending from the axial portion 20. The annular seal member 14 is preferably formed of an elastomeric material, such as natural or synthetic rubber, a thermoplastic, etc., and is connected with the case flange 22. The seal member 14 either has a circular, inner circumferential surface 17, as depicted in FIGS. 1-4 and 7-12, or a circular outer circumferential surface 19, as shown in FIGS. 5 and 6, each surface 17, 19 being centered about the centerline $CL_S$ and providing the sealing surface 15. The sealing surface 15 is sealingly engageable with the shaft outer surface 1a (or the outer surface of a component, e.g., a sleeve, disposed about the shaft 1) or with the housing inner surface 2a (or the inner surface of a component disposed within the housing bore 3), as described in detail below.

Figure 2:
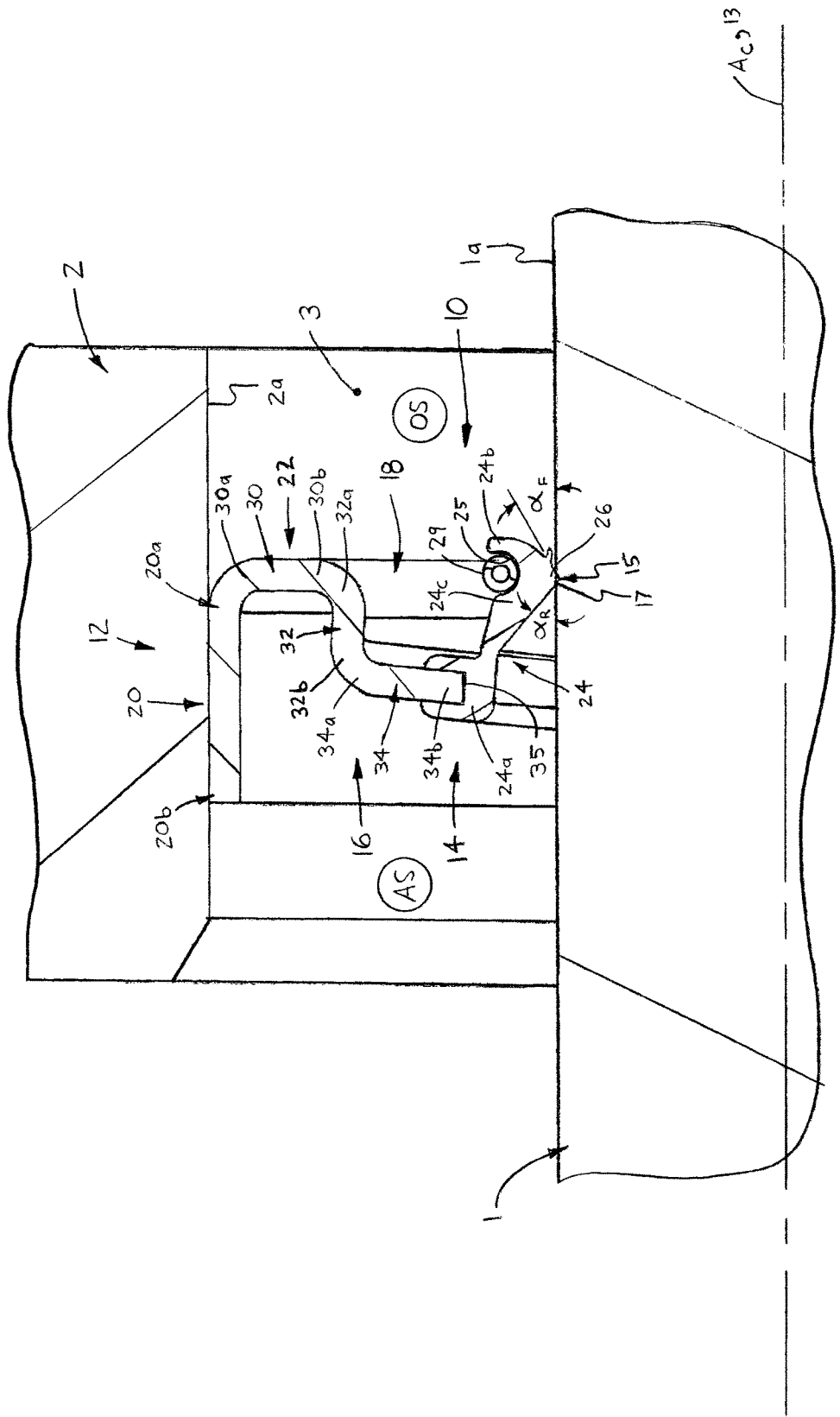
FIG. 2 is an enlarged view of an upper portion of FIG. 1.
Figure 3:
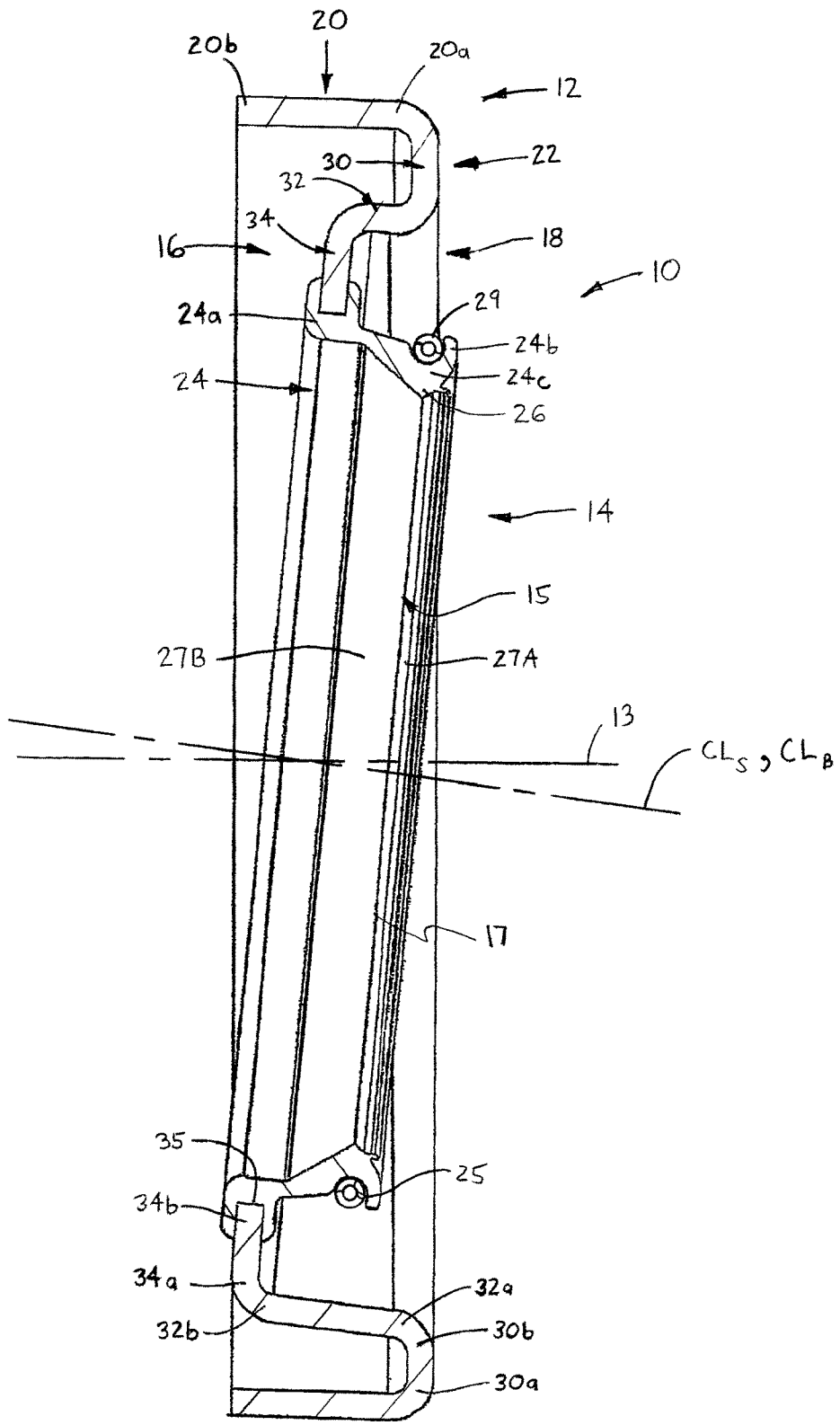
FIG. 3 is an axial cross-sectional view of the first construction seal assembly.

Preferably, the annular seal member 14 is formed as a radial lip seal having a "cantilever" body 24 with a fixed inner axial end 24a connected with the case 12, an opposing, free outer axial end 24b, and a wedge-shaped section 24c adjacent to the free end 24b providing the sealing surface 15. As best shown in FIGS. 3 and 11, the wedge-shaped section 24c of the seal body 24 includes an annular lip 26, on which is formed the sealing surface 15 and having a front face 27A and an opposing rear face 27B. The front and rear faces 27A, 27B intersect at the sealing surface 15 so as to establish front and rear contact angles $\alpha_F$, $\alpha_R$, respectively, between each face 27A, 27B and the shaft 1 or housing 2, as indicated in FIG. 2. Preferably, the seal assembly 10 is utilized such that the front face 27A is located on a higher pressure or "oil side" OS of the seal assembly 10 and a rear face 27B located on a lower pressure or "air side" AS of the assembly 10. Further, the cantilever body 24 preferably also includes an annular groove 25 and a garter spring 29 is disposed within the groove 25 and configured to bias the seal body 24 radially-inwardly (FIGS. 1-3, 7, 8 and 10-12) or radially-outwardly (FIG. 5) so as to establish contact pressure between the lip 26 and the shaft outer surface 1a or the housing inner surface 2a. However, the seal member 14 may be formed or/and employed in any other appropriate manner.

With the above-described orientation of the sealing surface centerline $CL_S$ with respect to the central axis $A_C$, the sealing surface 15 engages the shaft outer surface 1a or the housing inner surface 2a so as to define a generally elliptical sealing interface SI extending circumferentially about the central axis $A_C$, as shown in FIGS. 1, 5, 7, 10 and 12. The sealing interface SI has two axial end points $P_1$, $P_2$ spaced circumferentially apart about the central axis $A_C$ by about one hundred eighty degrees (180°) and axially apart by an axial distance $D_A$ along the central axis $A_C$. Further, the two end points $P_1$, $P_2$ axially bound a contact band BC of the shaft outer surface 1a having a width equal to the axial distance $D_A$, the width of the contact band BC preferably being at least one millimeter (1 mm) and most preferably at least four millimeters (4 mm).

With prior known seal assemblies, the shaft surface contacted by a seal lip is a narrow circular band directly under the compressed lip, typically with a width of between about one tenth millimeter (0.1 mm) and about five tenths of a millimeter (0.5 mm), the entirety of which remains constantly engaged by the lip during rotation of the shaft. However, by increasing the contact area of the sealing surface 15 due to angling the seal interface SI axially across the shaft outer surface 1a, only a portion of the shaft surface area within the contact band BC is in engagement with the sealing lip 26 at any instant during the rotation of the shaft 1. That is, as the shaft 1 rotates, sections of the shaft contact band BC pass under the sealing surface 15 of the lip 26, while remaining contact band sections are exposed to either air or oil (or other fluid being retained, e.g., grease, water, etc.). As such, heat dissipation, by convection or/and conduction, from the uncovered sections of the contact band BC is increased, thereby reducing the amount of heat transferred through the elastomeric seal member 14. Thus, the material degradation rate of the seal member 14 is substantially reduced in comparison with previously known seal assemblies, with a corresponding increased life of the seal assembly 10. Likewise, although typically formed of relatively harder materials than the sealing member 14, the shaft 1 or the housing 2 (i.e., whichever is being sealed against) also has a reduction in material degradation due to the increased size of the contact band BC.

Further, the seal member 14 is oriented such that one of the two axial end points $P_1$, $P_2$ of the sealing interface SI is a "front" end point $P_1$, at which the seal front face 27A is located furthest into the oil side OS, and the other one of the two axial end points $P_1$, $P_2$ is a "rear" end point $P_2$, at which the seal front face 27A is located at a lesser distance into (or greater distance from) the oil side OS. With this arrangement, the sealing lip 26 engages the shaft 1 or the housing 2 with a contact pressure which varies between a greatest value at one of the two axial end points $P_1$ or $P_2$, preferably the front end point $P_1$, and a least value at the other one of the two axial end points $P_2$, $P_1$, preferably the rear end point $P_2$, due to a distortion of the contact angles $\alpha_F$, $\alpha_R$ between the seal faces 27A, 27B and the shaft 1 or the housing 2. With the varying contact pressure, the inclined seal member 14 provides a "pumping effect" to assist in preventing fluid on the oil side OS of the seal assembly 10 from leaking past the seal lip 26, due to "pushing" the fluid away from the lip 26, and in certain applications, to circulate fluid back towards a device being lubricated, such as a bearing. Having described the basic structure and functioning above, these and other elements of the present seal assembly 10 are described in further detail below.

Referring to FIGS. 1-9, in certain constructions as stated above, the seal member 14 is formed with a generally conventional circular cylindrical body having a body centerline $CL_B$ that is coaxial with the sealing surface centerline $CL_S$, and the seal assembly 10 further comprises a coupler 18. The coupler 18 is configured to connect the seal member 14 with the case 12, or to connect the case 12 with the housing 1, such that the seal member 14 is positioned with both the centerline $CL_B$ of the seal member 14 and the centerline $CL_S$ of the sealing surface 15 intersecting or skew with respect to the central axis $A_C$ when the seal assembly 10 is installed about the shaft 1. Further, the coupler 18 may be integrally formed with the case 12 or may be provided by a discrete component attached to the case 12, as described in detail below.

Figure 4:
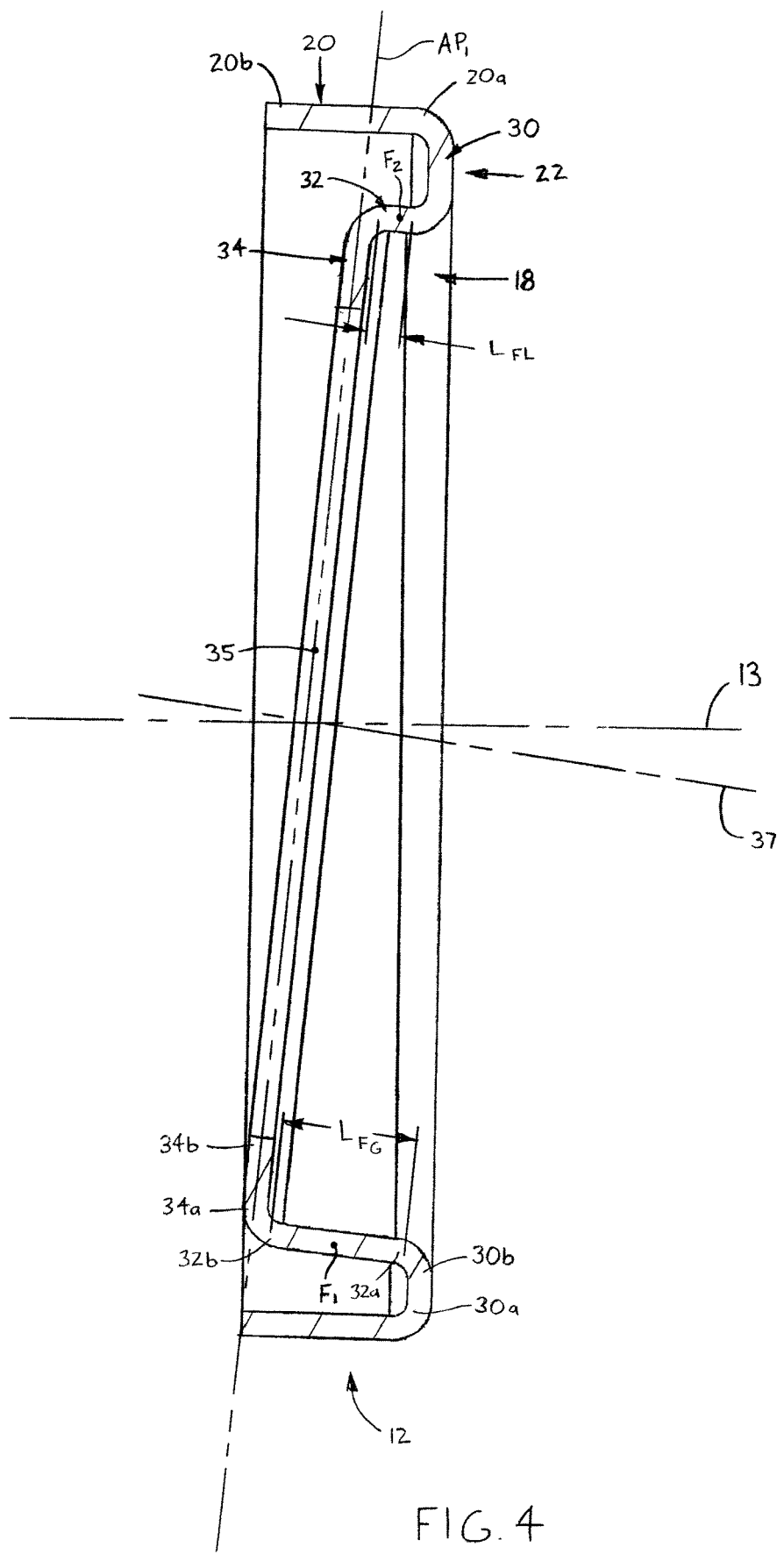
FIG. 4 is an axial cross-sectional view of a combined case and coupler of the first construction seal assembly.

Referring now to FIGS. 1-4, in a first construction, the case 12 is coupled with the housing 2 and the seal member 14 is configured to seal radially inwardly against the shaft outer surface 1a. Specifically, the case axial portion 20 is disposed against the housing inner surface 2a and the coupler 18 is formed as the radial flange 22 integral with the axial portion 20 and includes an outer radial portion 30, a central axial portion 32 and an inner radial portion 34. The outer radial portion 30 extends inwardly from an axial end 20a of the case axial portion 20 and has outer radial end 30a and an inner radial end 30b. The central axial portion 32 of the flange 22 has a first end 32a integrally formed with the inner end 30b of the outer radial portion 30 and an opposing second axial end 32b, and extends axially inwardly toward an opposing end 20b of the case axial portion 20. Further, the flange inner radial portion 34 extends inwardly from the second axial end 32b of the central axial portion 32 and has an outer radial end 34a and an inner end 34b defining a circular bore 35 with a centerline 37, as shown in FIG. 4. The inner end 24a of the seal member body 24 is coupled with the inner radial portion 34 of the flange 22, and is preferably molded thereto.

As indicated in FIG. 4, the central axial portion 32 of the flange 22 has an axial length $L_F$ defined between the first and second ends 32a, 32b. The axial length $L_F$ of the flange axial portion 32 varies from a greatest value $L_{FG}$ at a first angular position $F_1$ about a centerline 13 of the case 12 to a least value $L_{FL}$ at a second angular position $F_2$ about the case centerline 13 spaced about one hundred eighty degrees (180°) from the first position $F_1$. As such, the inner radial portion 34 of the flange 22 and the inner end 24a of the seal body 24 are each disposed within an angled plane $AP_1$, the central axis $A_C$ extending non-perpendicularly to the angled plane $AP_1$ when the seal assembly 10 is disposed about the shaft 1. Thus, the structure of the central axial portion 32 having a varying axial length $L_F$ and the angled inner radial portion 34 of the case flange 22 provides an integral coupler 18 that positions the seal member 14 in the desired angular orientation described in detail above.

Referring to FIGS. 5 and 6, in a second construction, the case 12 is disposeable upon the shaft 1 and the seal member 14 is configured to seal radially outwardly against the housing inner surface 2a. Such a seal assembly 10 is particularly suited for a wheel end assembly in which the housing 2 is a rotatable outer hub (not depicted) and the shaft 1 is fixed with respect to the central axis $A_C$. In such an application, the case axial portion 20 has an inner circumferential surface 21B defining a central bore 23 which receives the shaft 1 and the coupler 18 is again formed as the radial flange 22 integral with the axial portion 20 of the case 12. The radial flange 22 includes an inner radial portion 40, a central axial portion 42 and an outer radial portion 44. The inner radial portion 40 extends outwardly from an axial end 20a of the case axial portion 20 and has an inner radial end 40a and an outer radial end 40b. The central axial portion 42 of the flange 22 has a first axial end 42a integrally formed with the outer end 40b of the inner radial portion 40 and an opposing, second axial end 42b, extends axially toward the opposing end 20b of the case axial portion 20 and has a varying length $L_F$, as discussed below.

Further, the flange outer radial portion 44 is generally S-shaped and extends outwardly from the second axial end 42a of the central axial portion 42 so as to be angled with respect to the case axis 13, and has an inner radial end 44a and an outer end 44b. Specifically, the flange outer radial portion 44 has a first radial section 45a extending radially from the central axial portion 42 and providing the inner end 44a, an axial section 45b and a second radial section 45c extending outwardly from the central section 45b and providing the outer end 44b. Furthermore, the inner axial end 24a of the seal member body 24 is coupled with the outer radial portion 44 of the flange 22, and is preferably molded thereto.

As indicated in FIG. 6, the central axial portion 42 of the flange 22 has an axial length $L_F$ defined between the first and second ends 42a, 42b. The axial length $L_F$ of the flange axial portion 42 varies from a greatest value $L_{FG}$ at a first angular position $F_1$ about the centerline 13 of the case 12 to a least value $L_{FL}$ at a second angular position $F_2$ about the case centerline 13 spaced about one hundred eighty degrees (180°) from the first position $F_1$. As such, at least the second radial section 45c of the outer radial portion 44 of the flange 22 and the inner end 24a of the seal body 24 are each disposed within an angled plane $AP_2$, the central axis $A_C$ extending non-perpendicularly to the angled plane $AP_2$ when the seal assembly 10 is disposed about the shaft 1. Thus, the structure of the central axial portion 42 having a varying axial length $L_F$ and the angled outer radial portion 44 of the case flange 22 provides an integral coupler 18 that positions the seal member 14 in the desired angular orientation described in detail above.

Figure 7:
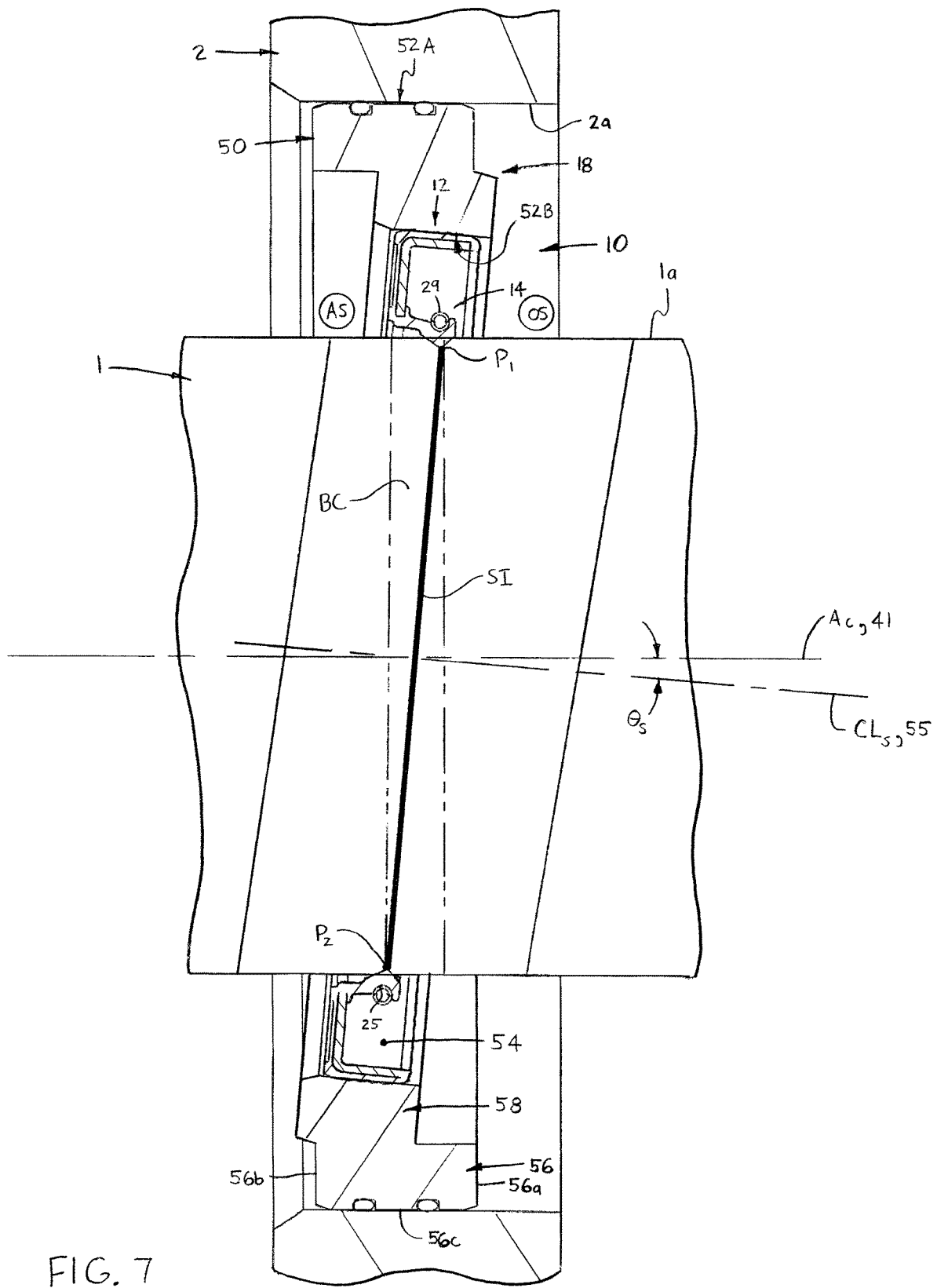
FIG. 7 is an axial cross-sectional view of a third construction of the seal assembly, shown installed about a shaft and within a housing.
Figure 8:
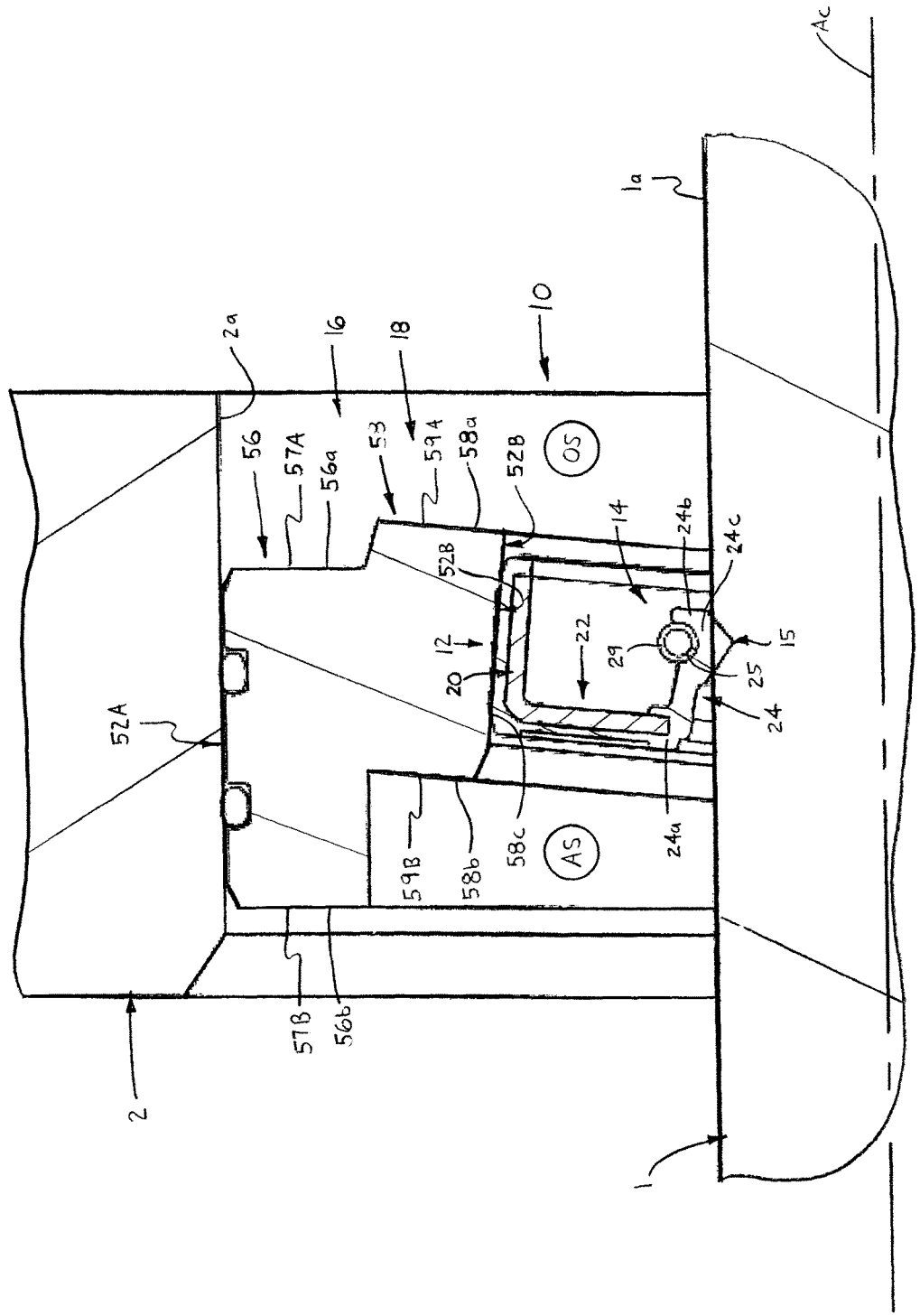
FIG. 8 is an enlarged view of an upper portion of FIG. 5.
Figure 9:
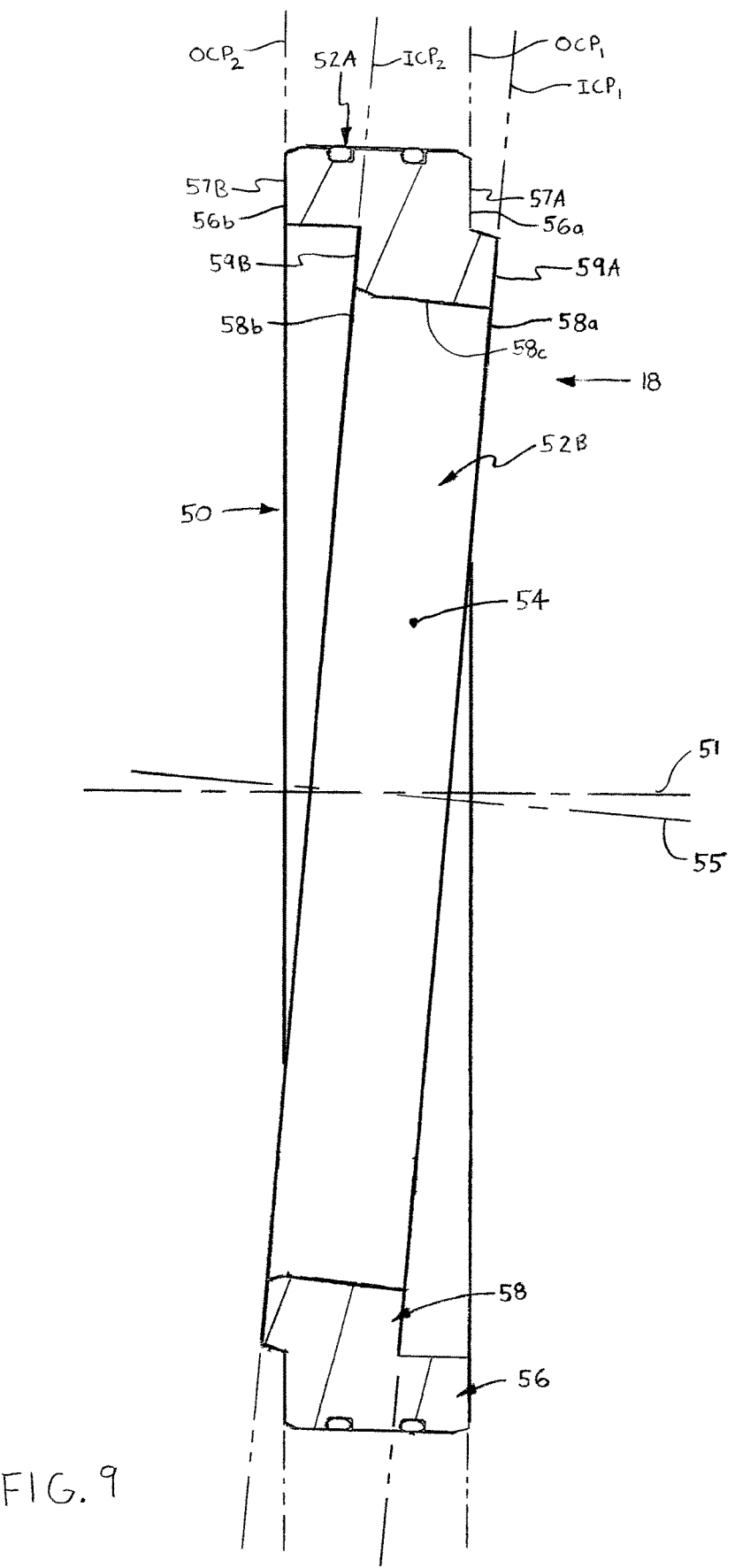
FIG. 9 is an axial cross-sectional view of a coupler of the third construction seal assembly.

Referring now to FIGS. 7-9, in a third construction, the coupler 18 is formed as a separate component configured to couple the case 12 with the housing 2 and to position the seal member 14 in the angled orientation as described above. Specifically, the coupler 18 includes an annular body 50 having a centerline 51, which is collinear with the central axis $A_C$ when the seal assembly 10 is installed about the shaft 1, a circular cylindrical outer circumferential surface 52A and a circular cylindrical inner surface 52B. The outer circumferential surface 52A of the coupler 18 is engageable with the housing inner surface 2a, preferably frictionally to axially retain the coupler 18 and the seal assembly 10 within the housing 2, and is centered about the body centerline 51. Further, the inner circumferential surface 52B of the coupler 18 defines a circular bore 54 and is centered about an axis 55 intersecting or skew with respect to the body centerline 51.

With this structure, when the case 12 of the seal assembly 10 is disposed within the bore 54 of the annular body 50, the coupler 18 is configured to position the case 12 and the seal member 14 such that the centerline $CL_S$ of the sealing surface 15 is collinear with the coupler bore axis 55. As such, the sealing surface centerline $CL_S$ is thereby also intersecting or skew with respect to the coupler body centerline 51, and thus also the central axis $A_C$ when the seal assembly 10 is installed about the shaft 1. Preferably, the annular body 50 of the third construction coupler 18 includes a radially outer cylindrical portion 56 and a radially inner cylindrical portion 58 disposed within and connected with the outer cylindrical portion 56.

Specifically, the outer cylindrical portion 56 has opposing axial ends 56a, 56b and an outer surface 56c providing the coupler outer surface 52A. Each axial end 56a, 56b of the outer portion 56 has a radial end surface 57A, 57B, respectively, disposed within a separate plane $OCP_1$, $OCP_2$, respectively. The two end surfaces 57A, 57B are substantially parallel to each other and the body centerline 51 extends at least substantially perpendicular to each of the two planes $OCP_1$ and $OCP_2$.

Further, the inner cylindrical portion 58 is preferably integrally formed with the outer cylindrical portion 56 and has opposing axial ends 58a, 58b and an inner circumferential surface 48c providing the coupler inner circumferential surface 52B and the bore 54. Each axial end 58a, 58b of the inner portion 58 has a radial end surface 59A, 59B, respectively, disposed within a separate plane $ICP_1$, $ICP_2$, respectively. The two end surfaces 59A, 59B of the body inner portion 58 are parallel to each other and the body centerline 51 extends non-perpendicularly to each one of the two planes $ICP_1$, $ICP_2$, such that the end surfaces 59A, 59B are each tilted or angled with respect to the end surfaces 57A, 57B of the body outer portion 56.

With the angled end surfaces 59A, 59B of the inner cylindrical portion 58, assembly of the seal case 12 (and attached seal member 14) into the coupler bore 54 is accomplished by positioning one axial end 20a or 20b of the case axial portion 20 aligned with one of the end surfaces 59B or 59A, respectively, of the coupler inner portion 58. Then, the case 12 is inserted into the bore 54 such that the circular outer circumferential surface 21 of the case 12 slides against the circular inner circumferential surface 52B of the coupler body 50 and is displaced along the bore axis 55 until fully disposed therein. Thereafter, the centerline $CL_S$ of the sealing surface 15 is at least parallel to and preferably collinear with the bore axis 55, such that the sealing surface 15 and the seal member 14 are oriented in the desired angular relationship to the central axis $A_C$ as described above.

Although the above-described structure provides a separate coupler 18 that positions a standard seal in the desired angled orientation, the annular body 50 may alternatively be formed in any other appropriate manner that provides an outer circumferential surface 52A engageable with the housing inner surface 2a and centered about the central axis $A_C$ and an inner circumferential surface 52B engageable with a seal case 12 and centered about an axis 55 intersecting or skew with respect to the central axis $A_C$. Alternatively, the separate coupler 18 may be formed as generally annular inner body (not shown) having a cylindrical inner circumferential surface disposeable about the shaft 1 and an angled outer circumferential surface for receiving a standard inner case member with a standard, outwardly-sealing circular lip engageable with the housing inner surface 2a so as to form the elliptical sealing interface SI.

Referring now to FIGS. 10-11, in a fourth construction, the seal assembly 10 is formed without any coupler or means to position a generally standard seal member 14 in the desired angled orientation, but rather includes a seal member 14 with a "non-conventional" cantilever annular body 60 having an angled outer end 60a with an angled circular lip 62 providing the sealing surface 15, as discussed above. More specifically, the case 12 includes the axial portion 20 with opposing axial ends 20a, 20b and the radial flange 22 extends radially inwardly (as depicted) or outwardly from the axial portion 20. The radial flange 22 is circumferentially uniform or symmetrical about the case centerline 13 and includes the inner end 22a for receiving the seal member 14. The seal member annular body 60 has a centerline 61 and includes an inner axial end 60b connected with the inner end 22a of the case flange portion 22, the opposing outer end 60a providing the sealing surface 15, and a central portion 60c. The body inner axial end 60b is circular and is disposed in a plane (not indicated) that is substantially perpendicular to any plane containing the body centerline 61, and thus also the central axis $A_C$ when installed on the shaft 1.

Further, the body central portion 60c extends axially between the inner end 60b and the outer end 60a and has an axial length BL, which varies from a greatest value $BL_G$ at a first angular position $PA_1$ about the body centerline 61 to a least value $BL_L$ at a second angular position $PA_2$ about the centerline spaced one hundred eighty degrees (180°) from the first angular position $PA_1$. With a central portion 61c having such a varying axial length BL, the outer end 60a is positioned in an angled orientation, such that the circular sealing lip 62, and thus the sealing surface 15, are disposed within an angled plane $AP_3$ and the sealing surface 15 has a centerline $CL_S$ perpendicular to the plane $AP_3$. The body centerline 61 extends non-perpendicularly to the angled plane $AP_3$, such that the central axis $A_C$ is likewise non-perpendicular to the plane $AP_3$ when the seal assembly 10 is disposed about the shaft 1. Therefore, the sealing surface 15 is located in the angled orientation, i.e., the sealing surface centerline $CL_S$ is skew or intersecting the central axis $A_C$, that provides the elliptical sealing interface SI when engaged with the shaft outer surface 1a (as depicted) or the housing inner surface 2a (not shown) as described in detail above.

Figure 12:
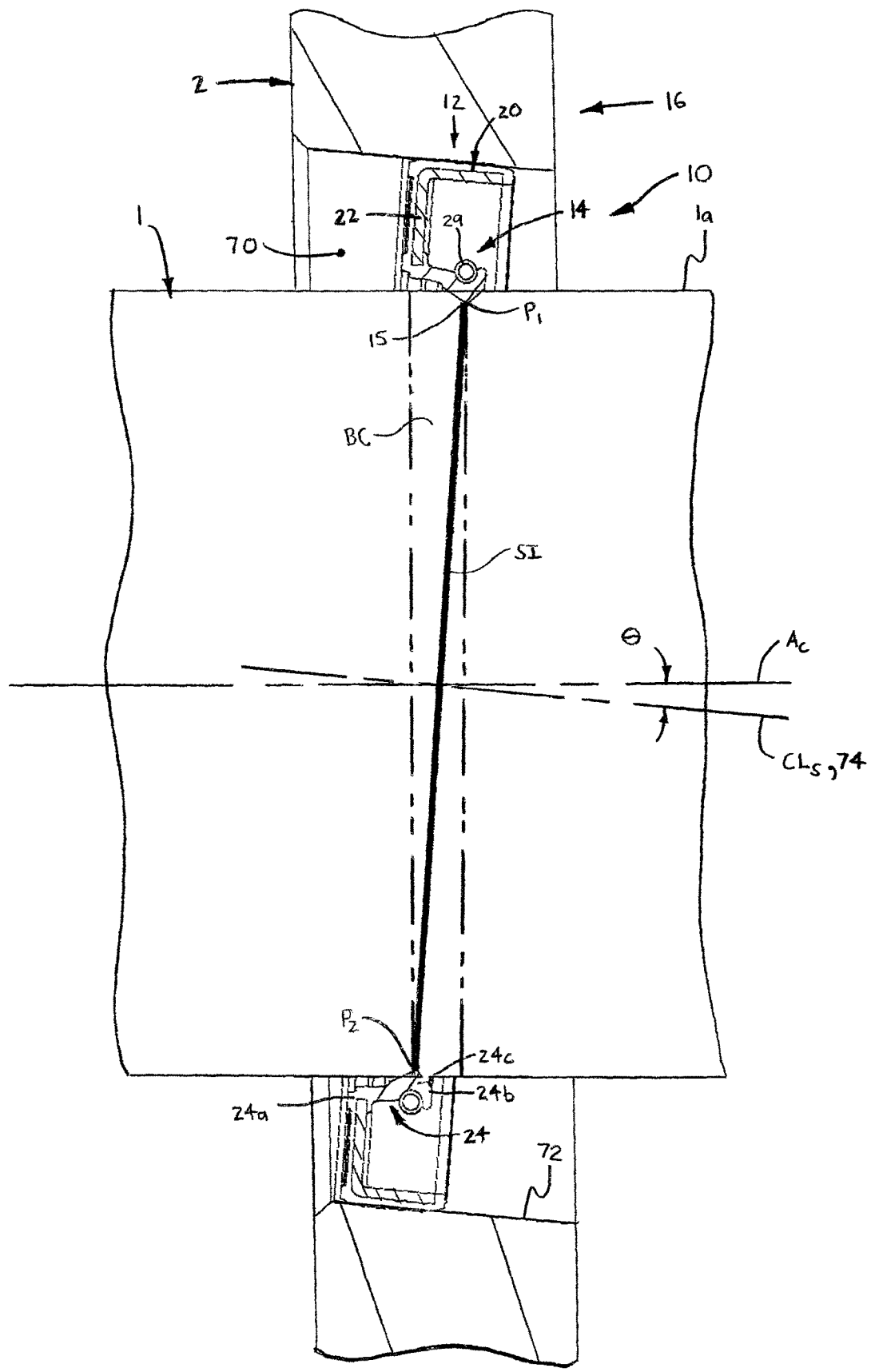
FIG. 12 is an axial cross-sectional view of a fifth construction of the seal assembly, shown installed about a shaft and within a housing.

Referring specifically to FIG. 12, although a coupler 18 is a preferred means 16 for positioning the seal member 14 with respect to the central axis $A_C$ as described above, another possible structure or device for angling the seal member 14 is providing an angled bore 70 in the housing 2. The angled bore 70 is defined by an inner circumferential surface 72 and has a centerline 74 that is angled, i.e., skew or intersecting, with respect to the central axis $A_C$ of any shaft 1 installed therein. As such, the installation of any generally conventional seal assembly 10 within the bore 70 will position the seal member 14 in the angled orientation as described in detail above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

We claim:

1. A seal assembly for sealing an annular space between a shaft and a housing, the shaft or the housing being rotatable about a central axis extending through the shaft, the shaft having an outer circumferential surface and the housing having an inner circumferential surface, the seal assembly comprising:
    an annular case coupleable with the housing or with the shaft; and
    an annular seal member coupled with the annular case and having a circular sealing surface with a centerline, the circular sealing surface being engageable with the shaft outer circumferential surface or with the housing inner circumferential surface such that the centerline of the sealing surface is angled or skew with respect to the central axis when the seal assembly is installed about the shaft,
    wherein a central portion of the annular seal member having a varying axial length.

2. The seal assembly as recited in claim 1 wherein the centerline of the circular sealing surface defines an angle with respect to the central axis, the angle having a value of at least one degree.

3. The seal assembly as recited in claim 1 wherein the circular sealing surface engages the shaft outer circumferential surface or the housing inner circumferential surface so as to define a generally elliptical sealing interface extending circumferentially about the central axis.

4. The seal assembly as recited in claim 3 wherein the elliptical sealing interface has two axial end points spaced circumferentially apart about the central axis by about one hundred eighty degrees and axially apart by an axial distance along the central axis, the two axial end points axially bounding a contact band of the shaft outer circumferential surface or of the housing inner circumferential surface, the contact band having a width equal to the axial distance.

5. The seal assembly as recited in claim 4 wherein the width of the contact band is at least one millimeter.

6. The seal assembly as recited in claim 4 wherein the seal member includes an annular lip providing the circular sealing surface and having a front face and a rear face, the front and rear faces intersecting at the sealing surface, the sealing lip engaging the shaft or the housing with a contact pressure, the contact pressure varying between a greatest value at one of the two axial end points and a least value at the other one of the two axial end points.

7. The seal assembly as recited in claim 1 wherein one of:
    the seal member has a centerline coaxial with the centerline of the sealing surface and the seal assembly further comprises a coupler configured to connect the seal member with the case or to connect the case with the housing such that the seal member is positioned with the centerline of the sealing surface intersecting or skew with respect to the central axis when the seal assembly is installed about the shaft; and
    the seal member has an inner end connected with the case, an outer end providing the sealing surface and a central portion extending between the inner end and the outer end and having an axial length, the axial length of the central portion varying from a greatest value at a first angular position about the centerline to a least value at a second angular position about the centerline spaced one hundred eighty degrees from the first angular position such that the sealing surface is disposed within an angled plane, the central axis extending non-perpendicularly to the angled plane when the seal assembly is disposed about the shaft.

8. The seal assembly as recited in claim 7 wherein the coupler is integrally formed with the case or is a discrete component attached to the case.

9. The seal assembly as recited in claim 7 wherein the case has an outer axial portion and the coupler is formed as an integral flange of the case and includes:
    an outer radial portion extending inwardly from the case axial portion and having an inner end;
    a central axial portion having a first axial end integrally formed with the inner end of the outer radial portion and an opposing second axial end; and
    an inner radial portion extending inwardly from the second axial end of the central portion and having an inner end defining a circular bore, an inner end of the seal member being coupled with the inner radial portion;
    wherein the central axial portion of the flange has an axial length between the first and second axial ends, the axial length varying from a greatest value at a first angular position about the centerline to a least value at a second angular position about the centerline spaced one hundred eighty degrees from the first position such that the inner radial portion of the flange and the inner end of the seal member are each disposed within an angled plane, the central axis extending non-perpendicularly to the angled plane when the seal assembly is disposed about the shaft.

10. The seal assembly as recited in claim 7 wherein the case has an inner axial portion disposeable upon the shaft and the coupler is formed as an integral flange of the case and includes:
- an inner radial portion extending outwardly from the case axial portion and having an outer end;
- a central axial portion having a first axial end integrally formed with the outer end of the inner radial portion and an opposing second axial end; and
- an outer radial portion extending outwardly from the second axial end of the central portion and having a circular outer end, the inner end of the seal member being coupled with the outer radial portion;
- wherein the central axial portion of the flange has an axial length between the first and second axial ends, the axial length varying from a greatest value at a first angular position about the centerline to a least value at a second angular position about the centerline spaced one hundred eighty degrees from the first position such that at least a section of the outer radial portion of the flange and the inner end of the seal member are each disposed within an angled plane, the central axis extending non-perpendicularly to the angled plane when the seal assembly is disposed about the shaft.

11. The seal assembly as recited in claim 7 wherein the coupler includes an annular body having a centerline, the centerline being collinear with the central axis when the seal assembly is installed about the shaft, a circular cylindrical outer circumferential surface engageable with the housing inner surface and centered about the body centerline, and a circular cylindrical inner circumferential surface defining a bore and being centered about an axis intersecting or skew with respect to the body centerline, the case being disposed within the bore of the annular body such that the seal member centerline is collinear with the bore axis.

12. The seal assembly as recited in claim 11 wherein the annular body of the coupler includes:
- a radially outer cylindrical portion having opposing axial ends, each axial end having a radial end surface disposed within a separate plane, the two end surfaces being parallel and the body centerline extending perpendicular to each of the two planes; and
- a radially inner cylindrical portion disposed within and connected with the outer cylindrical portion, the inner cylindrical portion having opposing axial ends, each axial end of the inner cylindrical portion having a radial end surface disposed within a separate plane, the two end surfaces of the inner cylindrical portion being parallel and the body centerline extending non-perpendicularly to each plane containing one of the end surfaces of the inner cylindrical portion.

13. The seal assembly as recited in claim 1 wherein the annular seal member has an inner end connected with the annular case, an opposing, free outer end, and an inner wedge-shaped portion adjacent to the free end and providing the circular sealing surface.

14. A seal assembly for sealing an annular space between a shaft and a housing, the shaft being rotatable about a central axis, the seal assembly comprising:
- an outer annular case coupleable with the housing;
- an inner annular seal member having a circular, inner circumferential sealing surface, and a central portion with a varying axial length such that a centerline of the sealing surface intersects or is skew with respect to the central axis when the seal assembly is installed about the shaft.

15. The seal assembly as recited in claim 14 wherein the means for positioning the seal member includes one of:
- a coupler configured to connect the seal member with the case or to connect the case with the housing;
- an angled bore extending through the housing.

16. A seal assembly for sealing an annular space between a shaft and a housing, the shaft or the housing being rotatable about a central axis extending through the shaft, the seal assembly comprising:
- an annular case coupleable with the housing or with the shaft; and
- an annular seal member with a cantilever annular body having a centerline, an inner axial end connected with the annular case, an angled outer axial end including a wedge-shaped section with a front face, a rear face and a lip providing a circular sealing surface, the front face and the rear face intersecting at the circular sealing surface, and a central portion extending axially between the inner axial end and the outer axial end and having an axial length, the axial length of the central portion varying from a greatest value at a first angular position about the centerline to a least value at a second angular position about the centerline spaced one hundred eighty degrees from the first angular position such that the circular sealing surface is disposed within an angled plane when the seal assembly is separate from the shaft and the housing, the central axis extending non-perpendicularly to the angled plane when the seal assembly is disposed about the shaft.

17. The seal assembly as recited in claim 16 wherein the circular sealing surface engages the shaft outer circumferential surface or the housing inner circumferential surface so as to define a generally elliptical sealing interface extending circumferentially about the central axis, the elliptical sealing interface having two axial end points spaced circumferentially apart about the central axis by about one hundred eighty degrees and axially apart by an axial distance along the central axis, the two axial end points axially bounding a contact band of the shaft outer surface or of the housing inner surface, the contact band having a width equal to the axial distance.

* * * * *